(12) United States Patent
Barney

(10) Patent No.: US 10,837,928 B2
(45) Date of Patent: Nov. 17, 2020

(54) FUSED QUARTZ GLASS REACTION CHAMBER AND RELATED METHODS SYSTEMS, AND APPARATUS

(71) Applicant: Jason Locke Barney, Draper, UT (US)

(72) Inventor: Jason Locke Barney, Draper, UT (US)

( * ) Notice: Subject to any disclaimer, the term of this patent is extended or adjusted under 35 U.S.C. 154(b) by 240 days.

(21) Appl. No.: 16/025,665

(22) Filed: Jul. 2, 2018

(65) Prior Publication Data

US 2020/0003715 A1    Jan. 2, 2020

(51) Int. Cl.
*G01N 25/08* (2006.01)
*G01N 1/44* (2006.01)

(52) U.S. Cl.
CPC ............... *G01N 25/08* (2013.01); *G01N 1/44* (2013.01)

(58) Field of Classification Search
CPC ................................. G01N 25/08; G01N 1/44
USPC .......................................................... 73/64.56
See application file for complete search history.

(56) References Cited

U.S. PATENT DOCUMENTS

| | | | | |
|---|---|---|---|---|
| 5,223,452 A * | 6/1993 | Knepprath | ............ | H01L 21/223 257/E21.141 |
| 5,571,684 A * | 11/1996 | Lawrence | ................ | C12Q 1/34 435/18 |
| 5,709,753 A * | 1/1998 | Olson | ...................... | B05D 1/60 118/719 |
| 5,906,943 A * | 5/1999 | Skorpik | ................... | G01N 1/44 422/106 |
| 6,558,069 B1 * | 5/2003 | Flader | ....................... | E01F 9/20 404/12 |
| 7,838,285 B1 * | 11/2010 | Dultz | ............... | G01N 27/44721 204/400 |
| 2007/0278097 A1 * | 12/2007 | Bhullar | ............... | B29C 65/1645 204/403.01 |
| 2008/0097143 A1 * | 4/2008 | Califorrniaa | ........... | C12M 29/04 600/22 |
| 2010/0103410 A1 * | 4/2010 | Silbergleit | ......... | G01N 21/6452 356/246 |
| 2012/0111117 A1 * | 5/2012 | Prakash | ............. | G01N 29/4472 73/599 |
| 2018/0073907 A1 * | 3/2018 | Cooper | ................... | G01F 23/02 |
| 2018/0098653 A1 * | 4/2018 | Pinchuk | ............. | A47G 19/2261 |

* cited by examiner

*Primary Examiner* — Nathaniel T Woodward
(74) *Attorney, Agent, or Firm* — Bretton L. Crockett; TechLaw Ventures, PLLC

(57) ABSTRACT

Reaction vessels which allow visualization while speeding vaporization or other reactions. In one illustrative embodiment, a reaction vessel may have sidewalls formed from a transparent material such as a clear quartz glass having relatively smooth surface and relatively low thermal transfer properties while allowing for visualization into the vessel. The vessel floor may be formed from a porous textured opaque quartz glass bottom. Liquids in the vessel will more readily react due to the numerous pores on the surface of the material of the bottom which serve as active nucleation sites during a chemical reaction process. Additionally, an unexpectedly higher rate of thermal diffusivity into the vessel interior may further increase reaction speeds. Methods of conducting and analyzing reactions using such vessels are further included in the present disclosure.

20 Claims, 3 Drawing Sheets

FUSED QUARTZ GLASS REACTION CHAMBER AND RELATED METHODS SYSTEMS, AND APPARATUS

TECHNICAL FIELD

The present disclosure relates to systems and methods for chambers for low temperature chemical reactions and vaporization.

BACKGROUND

Reaction vessels for use with small quantities of liquid typically are constructed from transparent materials in order to allow visualization and analysis of the liquid being investigated as it undergoes various reactions. For example, U.S. Pat. No. 5,082,632 to Gross, the contents of which are incorporated herein by reference in their entirety, discloses a reaction vessel including a moveable body and channels for movement of liquid constructed from a material that forms optical windows in the sides to allow for such visualization. Similarly, vaporization vessels and chambers are often constructed from transparent materials to allow for the visualization or analysis of the vaporization. Such transparent materials have smooth surfaces and are often relatively insulative with respect to heat transfer. This can cause relatively delayed reaction times as compared to those constructed from metal materials.

Reaction vessels that allowed for visualization of vaporization or other reactions for small quantities of liquids while speeding reaction times would be an improvement in the art.

SUMMARY

The present disclosure includes reaction vessels that allow visualization while speeding vaporization or other reactions. In one illustrative embodiment, a reaction vessel may have sidewalls formed from a transparent material such as a clear quartz glass having relatively smooth surface and relatively low thermal transfer properties while allowing for visualization into the vessel. The vessel floor may be formed from a porous textured opaque quartz glass bottom. Liquids in the vessel will more readily react due to the numerous pores on the surface of the material of the bottom which serve as active nucleation sites during a chemical reaction process. Additionally, an unexpectedly higher rate of thermal diffusivity into the vessel interior may further increase reaction speeds. Methods of conducting and analyzing reactions using such vessels are further included in the present disclosure.

DESCRIPTION OF THE DRAWINGS

It will be appreciated by those of ordinary skill in the art that the various drawings are for illustrative purposes only. The nature of the present disclosure, as well as other embodiments of the present invention, may be more clearly understood by reference to the following detailed description, to the appended claims, and to the several drawings.

DETAILED DESCRIPTION

The present disclosure relates to apparatus, systems and methods for reaction vessels for liquid based and vaporization reactions. It will be appreciated by those skilled in the art that the embodiments herein described, while illustrating certain embodiments, are not intended to so limit the disclosure or the scope of the invention. Those skilled in the art will also understand that various combinations or modifications of the embodiments presented herein can be made without departing from the scope of this disclosure. All such alternate embodiments are within the scope of the present invention.

Figure 1:
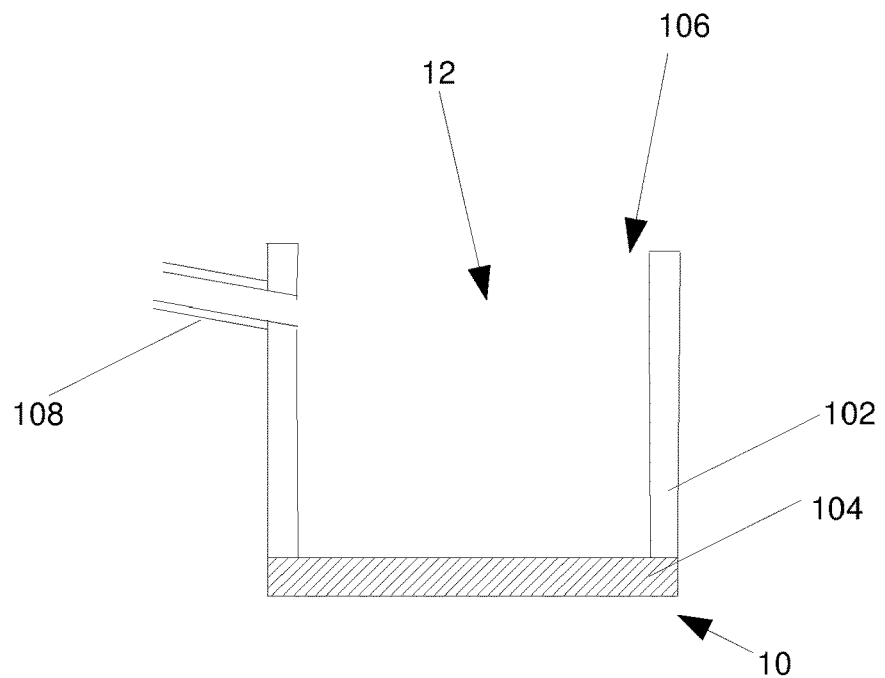
FIG. 1 is sectional side view of a first embodiment of a reaction vessel in accordance with the present disclosure.
Figure 2:
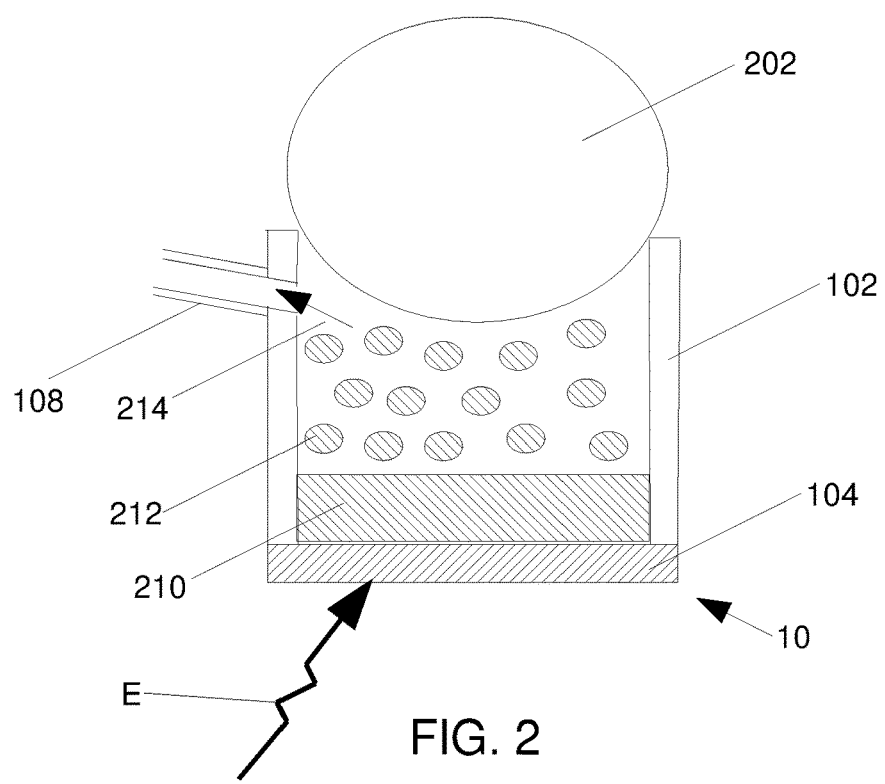
FIG. 2 is a sectional side view of the embodiment of FIG. 1, in use for a reaction including the vaporization of a liquid.

Referring to FIGS. 1 and 2, a first embodiment of a reaction vessel 10 that allows visualization while speeding vaporization or other reactions is depicted in isolation and in use. In the depicted embodiment, reaction vessel 10 may be formed as a columnar vessel with an open central chamber 12 formed from an encircling sidewall 102 with a bottom floor 104 and an open top 106. It will be appreciated that although a chamber 12 having a generally rounded shape where sidewall 102 is formed as a continuous circular or ovoid member are depicted, that other embodiments having sidewalls formed as planar member to result in a chamber with square, rectangular or other polygonal shape when viewed from above shape when viewed along a vertical axis may be used depending on the particular embodiment and a complete device in which it may be disposed for use.

Sidewalls 102 will be formed from a transparent material that is suitable for containing reactions to be conducted within the chamber 12. For example, where the vessel 10 will be used to conduct reactions involving vaporization that requires heating of the vessel, they may be constructed using a clear quartz glass. Such clear quartz glass may be primarily silica that is substantially free of colorants, or reactive materials to allow for visualization through the material. Such sidewalls may have relatively smooth surfaces to reduce refraction and reflection. However, compared to other materials used for reaction vessels, such sidewalls possess relatively low thermal transfer properties. For example, metal reaction vessels constructed from a material such as stainless steel allow for fast and efficient heat transfer into the chamber but prevent visualization therethrough.

The floor 104 of vessel 10 is formed from an opaque material that has physical features to enhance reactions occurring in the chamber 12. The opaque quartz glass floor 104 may be joined to the sidewalls 102 in a suitable manner that provides a sealed junction to allow for reactions to take place in chamber 12, without interference. For example, they may be joined to one another by flame welding to directly melt one quartz glass piece to join another. In some embodiments, the sidewalls may be formed from a tube of quartz glass that is joined to a planar piece of opaque quartz glass of suitable size and thickness in a suitable manner.

It is presently preferred that the floor 104 have a thickness greater than the sidewalls 102. In some embodiments, the floor may have thickness of from about 1.25 to about 2.5 the thickness of the sidewalls.

In the depicted embodiments, floor 104 may be formed from a porous textured opaque quartz glass material. Such materials include those disclosed in U.S. Pat. No. 5,972,488, issued Oct. 26, 1999 to Nagata et al., the contents of which are incorporated herein by reference in their entirety. It will be appreciated that opaque quartz glass manufactured using other methods, such as those disclosed in U.S. Pat. No. 5,772,714, issued Jun. 30, 1998 to Sato et al., the contents of which are incorporated herein by reference in their entirety, or in U.S. Pat. No. 5,585,173, issued Dec. 17, 1996 to Kamo, et al., the contents of which are incorporated herein by reference in their entirety, may be used so long as the required properties to achieve suitable reaction parameters in the vessel 10 are met.

As discussed in the Nagata patent, such opaque quartz glass may have an apparent density ranging from 1.7 to 2.1 g/cm$^3$, and an average bubble diameter ranging from 10 to 100 μm in an amount ranging from $3\times10^5$ to $5\times10^6$ bubbles/cm$^3$ and having a total bubble sectional area ranging from 10 to 40 cm$^2$/cm$^3$ for higher mechanical strength, higher workability, and higher precision of the glass face.

Such opaque quartz glass possesses an opaque white appearance from the gas bubbles dispersed uniformly therein. This opacity is confirmed by low linear transmittance to the light, as explained in Nagata. Additionally, such glass is known for low thermal conductivity owing to the presence of the bubbles. This heat-insulating property is further amplified by scattering of heat rays by the bubbles. Despite this known heat insulating property, applicant has found through testing that reaction vessels constructed in this manner from these materials exhibit a higher thermal diffusivity than reaction vessels constructed entirely from transparent quartz glass, as discussed in further detail herein. In fact, experimental data shows that the vessel 10 will heat up faster and cool down faster than a vessel constructed entirely of clear quartz glass having the same diameter and thickness.

Figure 3:
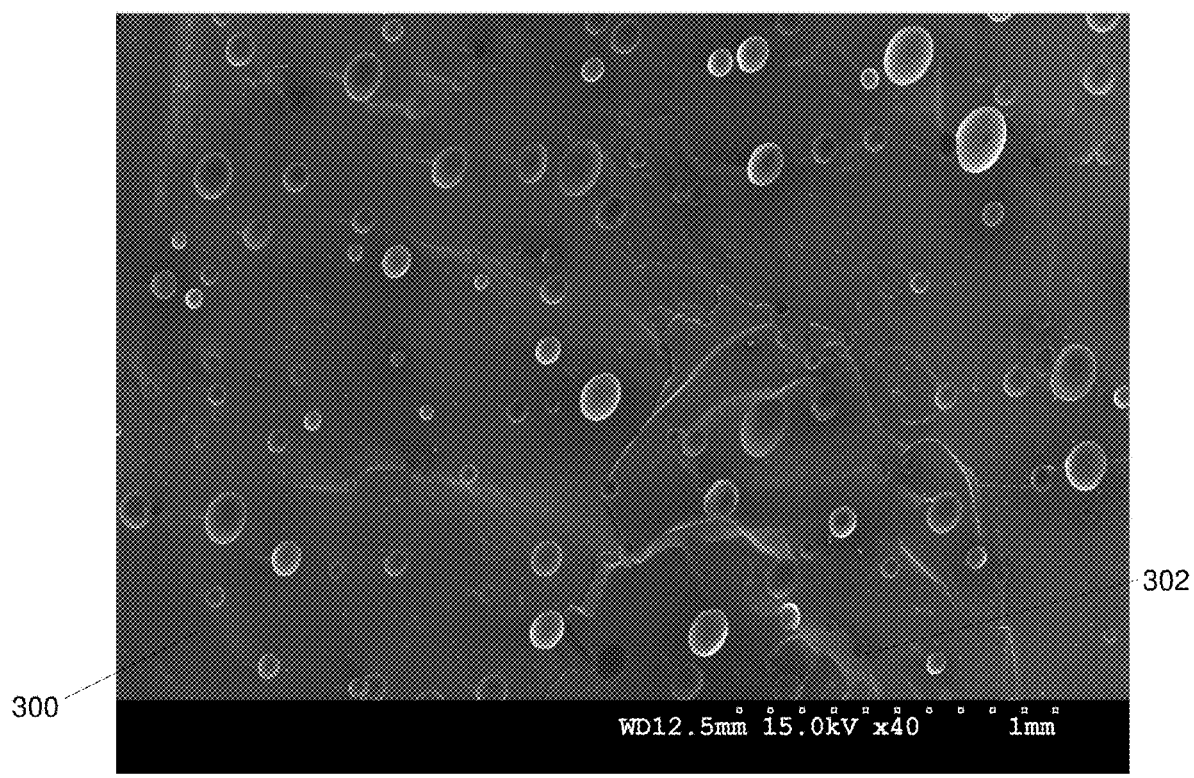
FIG. 3 is a micrograph of a material suitable for forming the bottom surface of the interior of the embodiment of FIGS. 1 and 2.

Additionally, the exposed surface of floor 104 in chamber 12 contains a number of microscopic pores that are open to the chamber 12. As the material is cut to form the exposed surface of the floor 104, the bubbles formed in the material along the plane of the cut are opened and the portion of each bubble below that plane forms a pore. FIG. 3 is a micrograph of a cut surface 300 of suitable opaque glass material for the floor 104 which shows the pores 302 formed from the cut bubbles. As depicted, while the surface 300 may appear smooth to the eye, it is microscopically rough, thereby creating nucleation points for vaporization and other reactions. As can be told from the scale, the gas bubbles in this material have a diameter ranging from about 100 to about 200 micrometers, resulting in pores having sizes up to this same amount. By contrast, examination of cheaper opaque materials made using different methods has irregularly shaped pores with diameters well under 50 micrometers that resulted in a less effective reaction vessel.

An outlet tube 108 may be disposed in sidewall 102 near an upper end of chamber 12 to allow for the removal of liquid or vapors during use, as for distillation, or other analysis or use. The outlet tube 108 may similarly be constructed of transparent quartz glass for joining to the sidewall 102 in a suitable manner or may be formed of other suitable materials.

During use, as depicted in FIG. 2, liquids in the reaction vessel 10 will more readily react through both the higher rate of thermal diffusivity as well as the numerous pores on the surface of the material of the bottom which serve as active nucleation sites during a chemical reaction process. As depicted, a liquid of interest 210 is placed in chamber 12 and energy, such as heat may be applied to the floor 104 from outside the vessel 10. Depending on the particular application, the energy could be provided by an electric heating element as part of an automated analyzer, by a Bunsen burner, or by another heat source, such as a butane torch. As the liquid heats up, it may begin to boil and vaporize, with the pores on the surface of the floor providing numerous microscopic points for the nucleation of vaporization reactions. As the liquid 210 vaporizes, gaseous particles 212 of the liquid are created and may be drawn through outlet 108 as indicated at arrow 214.

As depicted, the top 106 of chamber 12 may be closed with a suitable cap 202. In the depicted embodiment, the cap 202 may have an enlarged lower portion that extends into the chamber 12 to reduce the volume over liquid 210 as well as help retain heat in the chamber 12 to speed the reaction.

It will be appreciated that the textured bottom surface of vessels in accordance with the present disclosure may serve as a substrate having a multitude of nucleation sites, which a smooth polished clear quartz or smooth metal material lacks. Such sites may assist in the physical separation of constituent chemicals of a liquid of interest, requiring less heat energy to obtain to separation at lower temperatures for vaporization prior to use or distillation. Advantageously, surface contaminants burn off the opaque quartz vessel floor faster in comparison to transparent quartz material, thereby lowering the potential for devitrification of the vessel during use. Additionally, should devitrification of the floor occur, it will be masked by the white appearance of the opaque quartz glass floor while the remainder of the vessel remains transparent.

Experiment 1

Two duplicate reaction vessels were created, each having a circular chamber 2.5 cm in height and 2 cm in diameter, having a sidewall constructed of transparent quartz glass 2 mm in thickness and a lower floor or 3 mm in thickness. Vessel A had a lower floor constructed of opaque quartz glass while Vessel B had a lower floor constructed of transparent quartz glass.

Figure 4:
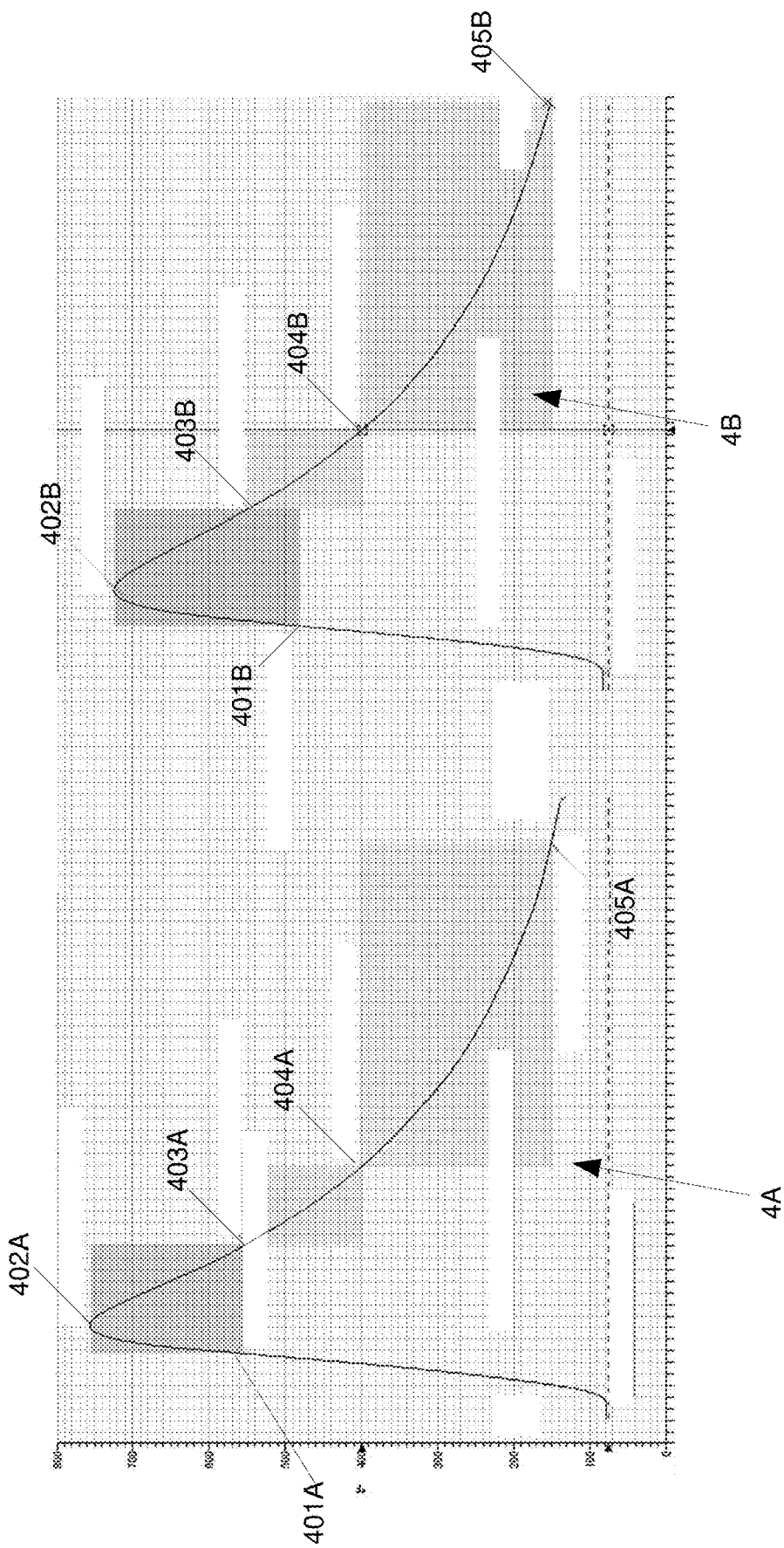
FIG. 4 is a graphic representation of temperature measurements taken in a reaction vessel constructed in accordance with the present disclosure compared to a reaction vessel lacking similar features.

A clear quartz insert was placed into each of Vessel A and Vessel B. heat was applied to the floor of the Vessel using a butane torch at its highest setting at an equal distance and angles for a duration of 65 seconds. The temperature of the quartz insert was monitored before, during, and after application of heat by a high-temperature thermocouple data logger Results and Discussion FIG. 4 depicts the results of Vessel A and Vessel B side by side as graphs 4A and 4B, respectively. The onset of heat application begins at points 401A and 401B, heat was removed at 402A and 402B, maximum temperature in the vessel at 403A and 403B, a reaction window defined as temperature range of 550 F-400 F for vaporization of was reached at points 404A and 404B and closed at 405A and 405B.

With respect to the reaction vessel with the opaque quartz glass bottom, temperature at removal heat (402A) was 568 F. Peak temperature (403A) reached was 756 F. The reaction window opened (404A) at 2:13 from heat removal and remained open (405A) for 1:39. It cooled to 150 F (406A) in 10:22. The control vessel temperature at removal heat (402B) was 483 F. Peak temperature (403B) reached was 724 F. The reaction window opened (404B) at 2:29 from heat removal and remained open (405B) for 1:42. It cooled to 150 F (406B) in 10:29.

The reaction vessel with the opaque quartz bottom heated faster (568 F vs 483 F at 65 seconds) and reached the reaction window greater than 10% faster (2:13 vs 2:29).

While this disclosure has been described using certain embodiments, the present disclosure can be further modified while keeping within its spirit and scope. This application is therefore intended to cover any variations, uses, or adaptations of the disclosure using its general principles. Further, this application is intended to cover such departures from the present disclosure as come within known or customary practices in the art to which this invention pertains and which fall within the limits of the appended claims.

What is claimed is:

1. A reaction vessel for visualization of reactions involving the vaporization of liquids, comprising:
    a surrounding sidewall defining the sides of a reaction chamber; the surrounding sidewall formed of a clear quartz glass material which is sufficiently transparent to allow visualization therethrough; and
    a vessel floor joined to a lower end of the surrounding sidewall to define a bottom of the reaction chamber, the vessel floor formed of an opaque quartz glass material containing gas bubbles that scatter light rays passing therethrough, the vessel floor having an exposed surface in the reaction chamber containing pores defined by voids from gas bubbles that resided at the portion of the material cut to form the exposed surface.

2. The reaction vessel of claim 1, wherein the vessel floor is formed of an opaque quartz glass material containing gas bubbles having a diameter ranging from 100 to 200 micrometers.

3. The reaction vessel of claim 1, wherein the vessel floor is formed of an opaque quartz glass material having an apparent density ranging from 1.7 to 2.1 $g/cm^3$, and an average bubble diameter ranging from 10 to 100 µm in an amount ranging from $3 \times 10^5$ to $5 \times 10^6$ bubbles/$cm^3$ and having a total bubble sectional area ranging from 10 to 40 $cm^2/cm^3$.

4. The reaction vessel of claim 1, wherein the vessel floor has a thickness of from 1.25 times to 2.5 times the thickness of the surrounding sidewall.

5. The reaction vessel of claim 1, further comprising an outlet tube attached to an opening formed in the surrounding sidewall at a point towards an upper end of the reaction chamber.

6. The reaction vessel of claim 1, wherein the reaction chamber has a generally rounded shape where the surrounding sidewall is formed as a generally continuous circular member.

7. A system for speeding the observation of vaporization reactions, the system comprising:
    a reaction vessel comprising a reaction chamber, the reaction chamber defined by
        a surrounding sidewall formed of a clear quartz glass material which is sufficiently transparent to allow visualization therethrough;
        a vessel floor formed of an opaque quartz glass material having an increased thermal diffusivity in comparison to the surrounding sidewall; and
    an outlet tube attached to an opening formed in the surrounding sidewall.

8. The system of claim 7, further comprising a cover for closing an open top of the reaction chamber by placement into contact with an upper end of the surrounding sidewall.

9. The system of claim 8, wherein the cover has an extended portion that protrudes into the reaction chamber when placed into contact with the upper end of the surrounding sidewall to reduce the volume of the reaction chamber.

10. The system of claim 7, wherein the vessel floor having an exposed surface in the reaction chamber containing pores defined by voids from gas bubbles that resided at the portion of the material cut to form the exposed surface.

11. The system of claim 7, wherein the vessel floor is formed of an opaque quartz glass material containing gas bubbles having a diameter ranging from about 100 to about 200 micrometers.

12. The system of claim 7, wherein the vessel floor is formed of an opaque quartz glass material having an apparent density ranging from 1.7 to 2.1 $g/cm^3$, and an average bubble diameter ranging from 10 to 100 µm in an amount ranging from $3 \times 10^5$ to $5 \times 10^6$ bubbles/$cm^3$ and having a total bubble sectional area ranging from 10 to 40 $cm^2/cm^3$.

13. The system of claim 7, wherein the vessel floor has a thickness of from 1.25 times to 2.5 times the thickness of the surrounding sidewall.

14. The system of claim 7, wherein the outlet tube is attached to an opening formed in the surrounding sidewall at a point towards an upper end of the reaction chamber.

15. The system of claim 7, wherein the reaction chamber has a generally rounded shape where the surrounding sidewall is formed as a generally continuous circular member.

16. A method of conducting a reaction involving the vaporization of liquids, the method comprising:
    placing a liquid of interest into a reaction vessel, the reaction vessel comprising
        a surrounding sidewall formed of a clear quartz glass material which is sufficiently transparent to allow visualization therethrough,
        a vessel floor formed of an opaque quartz glass material having features to increase onset of vaporization;
    heating the reaction vessel to cause vaporization of the liquid of interest to a vapor of interest;
    observing the vaporization through the surrounding sidewall; and
    collecting the vapor of interest for further use or analysis.

17. The method of claim 16, wherein placing a liquid of interest into a reaction vessel comprises placing the liquid of interest into a reaction vessel with a vessel floor having exposed pores defined by voids from gas bubbles that resided at the portion of the material cut to form the lower surface.

18. The method of claim 17, wherein the vessel floor is formed of an opaque quartz glass material containing gas bubbles having a diameter ranging from about 100 to about 200 micrometers.

19. The method of claim 17, wherein the vessel floor has a thickness of from 1.25 times to 2.5 times the thickness of the surrounding sidewall.

20. The method of claim 17, wherein collecting the vapor of interest for further use or analysis comprises collecting the vapor from an outlet tube attached to an opening formed in the surrounding sidewall at a point towards an upper end of the reaction chamber.

* * * * *